US010012369B1

(12) United States Patent
Wang

(10) Patent No.: US 10,012,369 B1
(45) Date of Patent: Jul. 3, 2018

(54) SEARCHLIGHT HAVING FUNCTION OF AUTOMATICALLY RETURNING TO STARTING POSITION

(71) Applicant: Mao-Shen Wang, New Taipei (TW)

(72) Inventor: Mao-Shen Wang, New Taipei (TW)

( * ) Notice: Subject to any disclaimer, the term of this patent is extended or adjusted under 35 U.S.C. 154(b) by 0 days.

(21) Appl. No.: 15/635,261

(22) Filed: Jun. 28, 2017

(30) Foreign Application Priority Data

Mar. 7, 2017 (TW) ............................ 106203168 U

(51) Int. Cl.

| | |
|---|---|
| ***B60Q 1/00*** | (2006.01) |
| ***F21V 21/15*** | (2006.01) |
| ***F21V 31/00*** | (2006.01) |
| ***F21V 23/04*** | (2006.01) |
| ***F21S 8/00*** | (2006.01) |

(52) U.S. Cl.
CPC .............. *F21V 21/15* (2013.01); *F21S 8/003* (2013.01); *F21V 23/0442* (2013.01); *F21V 31/005* (2013.01)

(58) Field of Classification Search
CPC .......... F21S 8/003; F21V 21/30; F21V 14/02; F21V 14/06; F21V 19/003; F21V 29/76; F21V 31/00; F21V 5/04; F21V 7/06; F21Y 2115/10
USPC .......................................................... 362/368
See application file for complete search history.

(56) References Cited

U.S. PATENT DOCUMENTS

| | | | | |
|---|---|---|---|---|
| 5,029,058 | A * | 7/1991 | Hirose | F21V 19/02 362/233 |
| 8,182,122 | B2 * | 5/2012 | Chiu | B60Q 1/245 362/272 |
| 8,858,038 | B2 * | 10/2014 | Haythornthwaite | F21V 19/02 362/188 |
| 9,249,960 | B2 * | 2/2016 | Wang | F21V 21/30 |
| 9,890,923 | B2 * | 2/2018 | Wang | F21V 5/04 |
| 2007/0041194 | A1 * | 2/2007 | Chiu | B60Q 1/245 362/286 |

* cited by examiner

*Primary Examiner* — Seung Lee
(74) *Attorney, Agent, or Firm* — Bacon & Thomas, PLLC

(57) ABSTRACT

A searchlight includes a lamp housing provided with a snap-action switch and/or a photo-electric switch, a support pivotally supporting the lamp housing from below and a lamp assembly pivotally installed inside the lamp housing; the lamp assembly has a back provided with a positioning lever for use in touch with the snap-action switch of the lamp housing; and the support has a top provided with a positioning lever for use in interrupting the light path of the photoelectric switch of the lamp housing; due to possessing aforesaid structure the searchlight therefore has a function of automatically returning to starting position when power supply is switched off.

3 Claims, 7 Drawing Sheets

SEARCHLIGHT HAVING FUNCTION OF AUTOMATICALLY RETURNING TO STARTING POSITION

BACKGROUND OF THE INVENTION

1. Field of the Present Invention

The present invention relates to a searchlight, and more particularly to a searchlight having function of automatically returning to starting position when power supply is switched off.

2. Description of Related Art

Referring to FIG. 1, a conventional spotlight 90 is a lamp capable of changing its lighting direction vertically and horizontally. The spotlight 90 comprises a lamp housing 91 and a support 92 pivotally supporting the lamp housing 91 from below.

In the lamp housing 91, a partition 94 divides the interior of the lamp housing 91 into a lamp compartment 91*a* and a driving-device compartment 91*b*.

A lamp assembly 95 is pivotally installed in the lamp compartment 91*a*. A vertical driving device 96 is installed in the driving-device compartment 91*b* and affixed to the partition 94. A horizontal driving device 97 is fixedly installed inside the support 92.

A curved rack 95*a* is provided behind the lamp assembly 95, for the vertical driving device 96 to engage and move the lamp assembly 95. In response to the driving force from the vertical driving device 96, the lamp assembly 95 tilts up and down in the lamp compartment 91*a* of the lamp housing 91, so as to provide a vertically changeable lighting angle.

A ring gear 91*c* is provided below the lamp housing 91, for the horizontal driving device 97 to engage and move the lamp housing 91. In response to the driving force from the horizontal driving device 97, the lamp housing 91, together with the lamp assembly 95 installed in its lamp compartment 91*a*, swivels right and left against the support 92, so as to provide a horizontally changeable lighting angle.

However, when the power supply which is supplied for the spotlight 90 is switched off, it is known that the searchlight 90 is disadvantageous in that the lamp assembly 95 cannot automatically return to the longitudinal starting position, the lamp housing 91 and the lamp assembly 95 cannot automatically return to the horizontal starting position either.

SUMMARY OF THE INVENTION

In view of this, the primary objective of the present invention is to provide a searchlight having a function of automatically returning to starting position when power supply is switched off.

Another primary objective of the present invention is to provide a searchlight includes a lamp housing provided with a snap-action switch and/or a photo-electric switch, a support pivotally supporting the lamp housing from below and a lamp assembly pivotally installed inside the lamp housing; wherein the lamp assembly has a back provided with a positioning lever for use in touch with the snap-action switch of the lamp housing; and the support has a top provided with a positioning lever for use in interrupting the light path of the photoelectric switch of the lamp housing. By possessing aforesaid structure, the searchlight therefore has a function of automatically returning to starting position when power supply is switched off.

DETAILED DESCRIPTION OF THE PREFERRED EMBODIMENT

Referring to FIG. 2 through FIG. 7, a searchlight 10 of the present invention is a versatile searchlight having its illuminating angle vertically and horizontally changeable, and particularly capable of providing function of automatically returning to starting position, when power supply is switched off.

Figure 1:
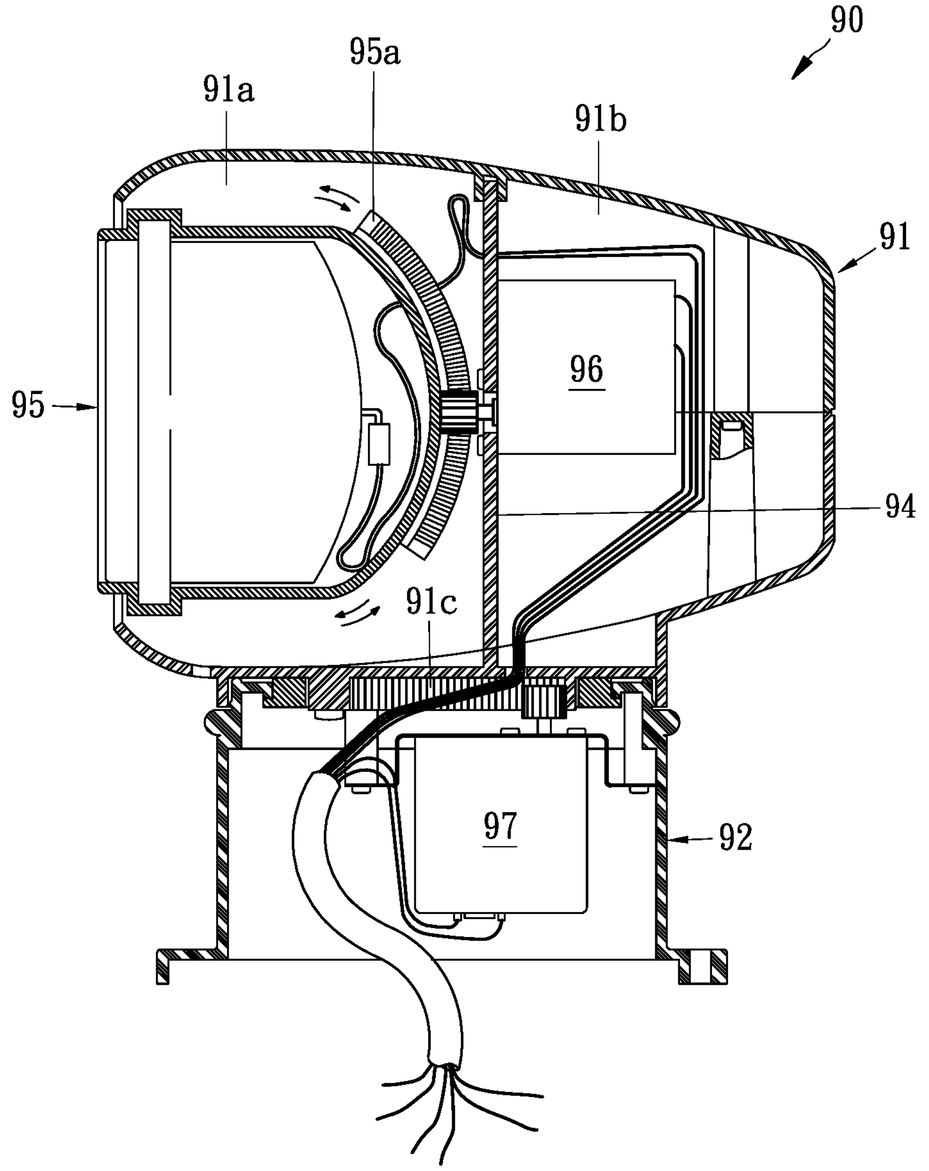
FIG. 1 (prior art)
FIG. 1 is a cross-sectional view of a conventional spotlight.
Figure 2:
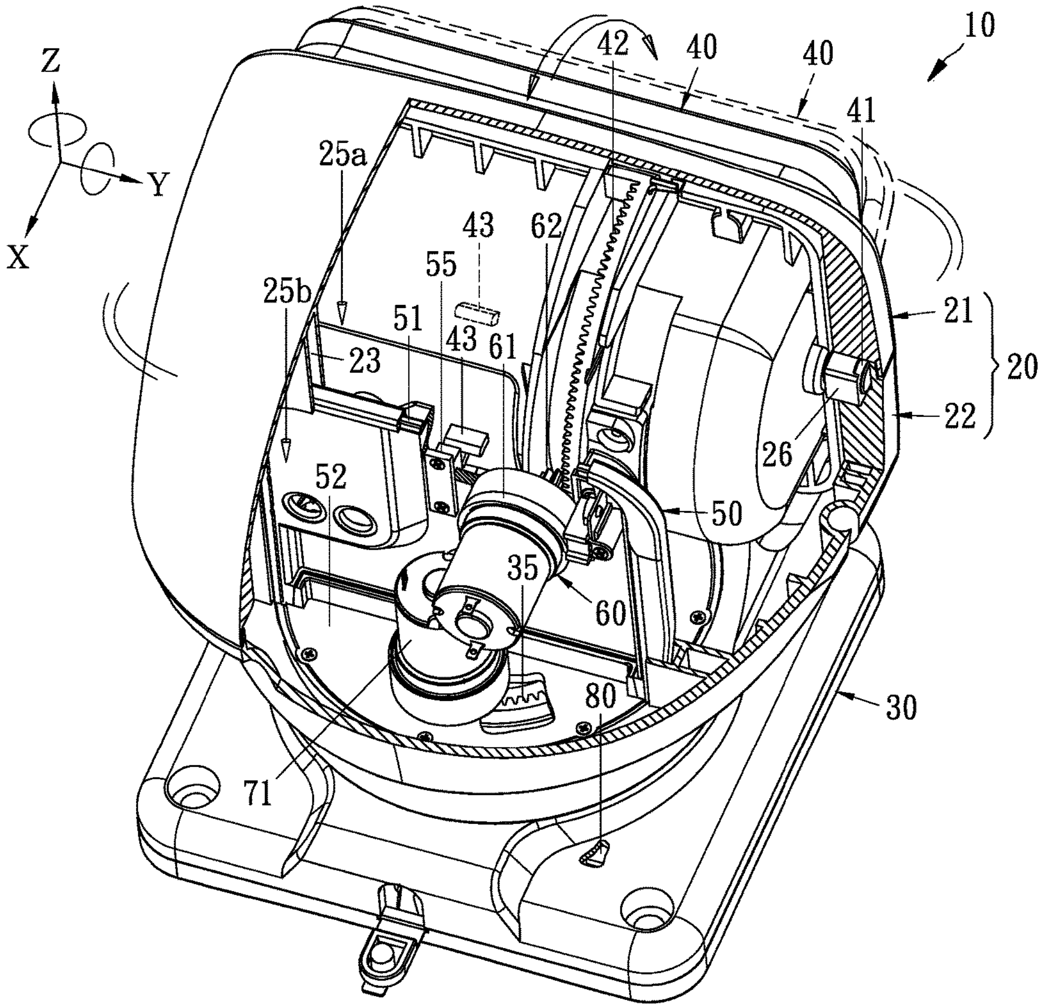
FIG. 2 is a schematic drawing of a searchlight according to the present invention as well as a cutaway view to show the interior of the searchlight.
Figure 3:
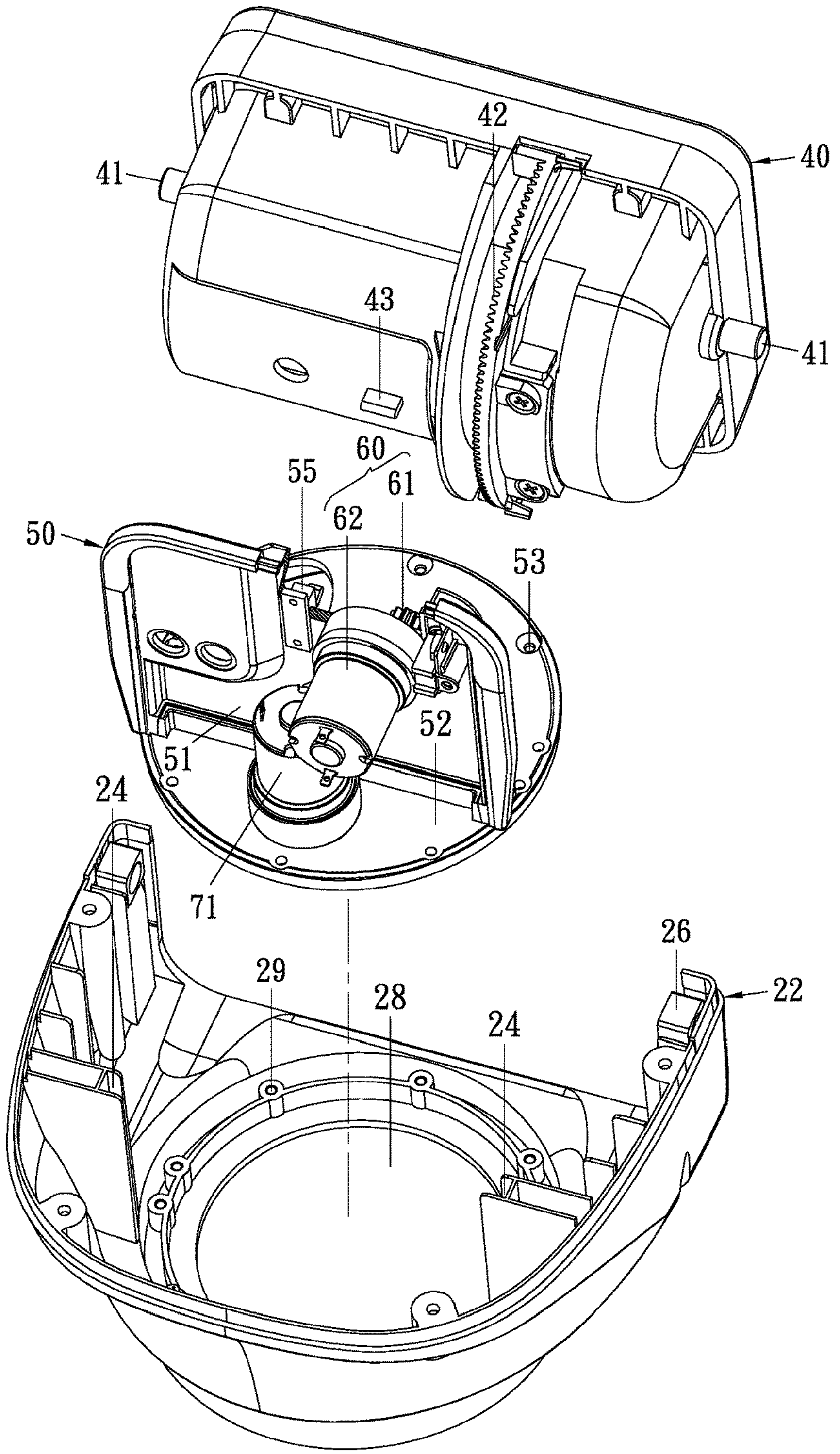
FIG. 3 depicts components of the searchlight of FIG. 2 that are installed in its lamp housing.
Figure 4:
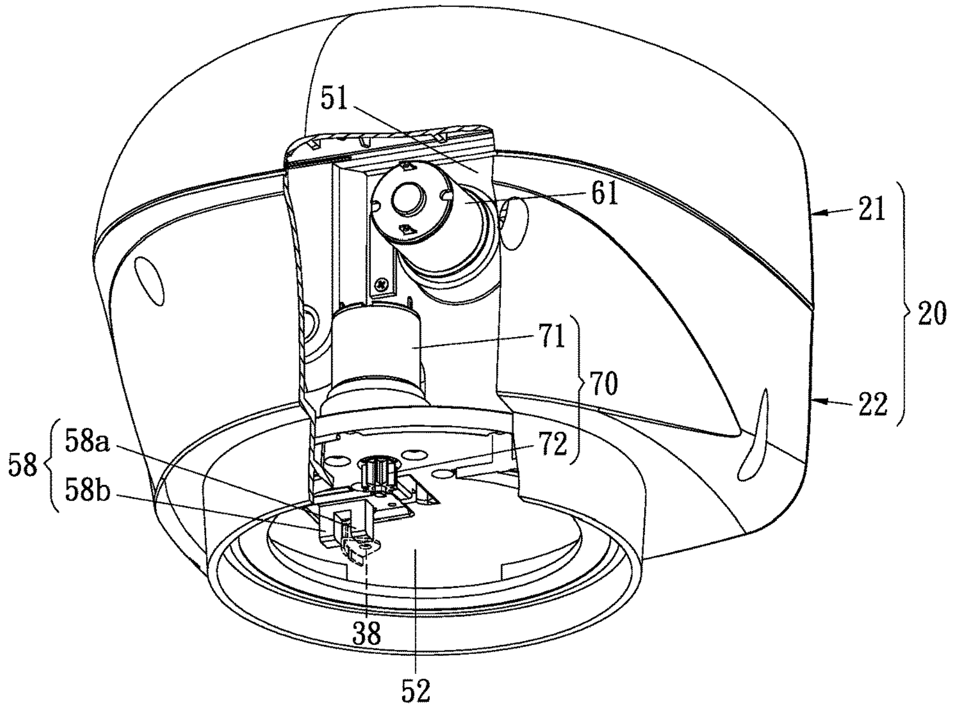
FIG. 4 is a schematic drawing of the lamp housing of the searchlight of FIG. 2 to show the bottom of the lamp housing provided with a photo-electric switch and the interior of the lamp housing provided with a vertical driving device as well as a horizontal driving device.
Figure 5:
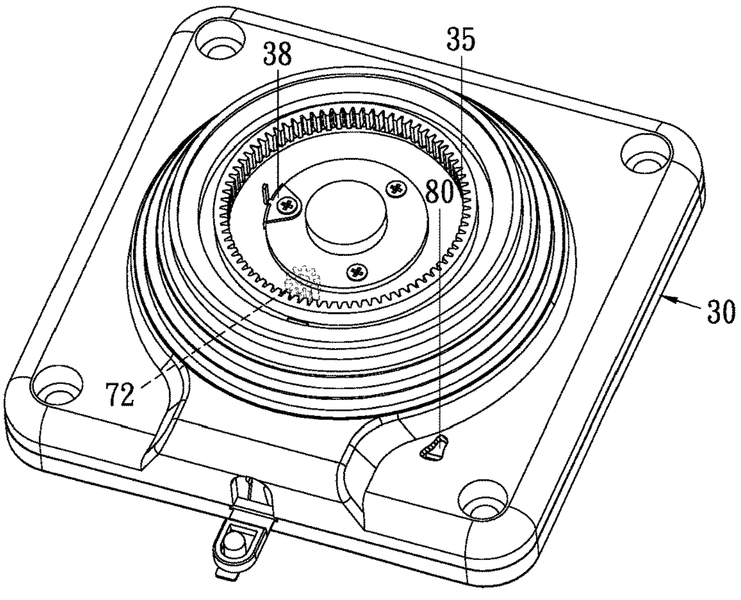
FIG. 5 is a schematic drawing of the support of the searchlight of FIG. 2 to show the top of the support provided with a stationary gear and a positioning blocker and the interior of the support provided with a microcontroller unit.

Referring to FIG. 2 through FIG. 5, the disclosed searchlight 10 comprises a lamp housing 20, a support 30 pivotally supporting the lamp housing 20 from below, a lamp assembly 40 pivotally installed inside the lamp housing 20, and a microcontroller unit (MCU) 80 securely installed inside the support 30 as shown in FIG. 2 or FIG. 5, otherwise alternatively installed inside the lamp housing 20.

The MCU 80 is an IC component that independently carries out specific control functions and integrates related circuits for a central processing unit (CPU), a read-on memory (ROM) or an electrically erasable programmable read-on memory (EEPROM), a random access memory, an I/O control circuit and a CTC timer on a single chip.

The ROM or the EEPROM of the MCU 80 stores control information regarding how to have a corresponding power supply switched on or switched off, so that the MCU 80 can control the power supply to be switched on or switched off according to the corresponding input control information.

Figure 7:
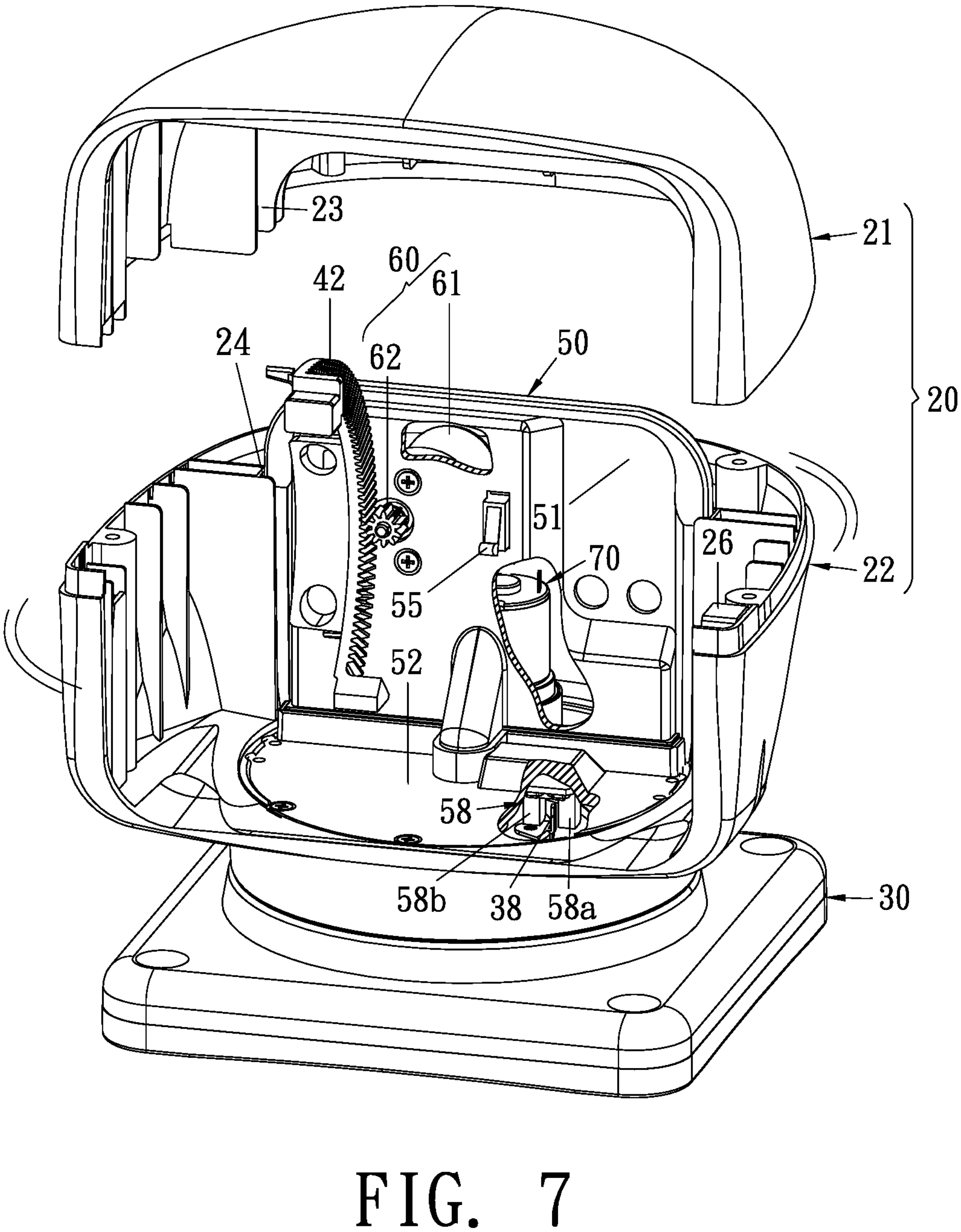
FIG. 7 is an explained drawing to show both the lamp housing and the lamp assembly of the searchlight of FIG. 2 is capable of being automatically remained at an initial position when the power supply is switched off.

As shown in FIG. 2, FIG. 4 and FIG. 7, the lamp housing 20 is composed of an upper half 21 and a lower half 22, and contains therein the above-mentioned lamp assembly 40, a moisture-proof partition set 50, a vertical driving device 60 and a horizontal driving device 70.

As shown in FIG. 2 and FIG. 7, the upper half 21 of the lamp housing 20 is provided with a first slot 23. As shown in FIG. 3 and FIG. 7, the lower half 22 of the lamp housing 20 is provided with a second slot 24 which is positional corresponding to the first slot 23 of the upper half 21. And, as shown in FIG. 3, the lower half 22 of the lamp housing 20 is further provided with a through hole 28 and a plurality of fixing ribs 29.

As shown in FIGS. 2-4 and FIGS. 6-7, the moisture-proof partition set 50 of the lamp housing 20 comprises a vertical partition 51 and a horizontal partition 52. And, the horizontal partition 52 of the moisture-proof partition set 50 has a plurality of locking holes 53 that are positional corresponding to the fixing ribs 29 at the lower half 22 of the lamp housing 20.

As shown in FIG. 2, FIG. 3 and FIG. 7, when assembled, the horizontal partition 52 of the moisture-proof partition set 50 is fixed to the lower half 22 of the lamp housing 20 by fixing members and then formed as a bottom of the lamp housing 20; and the vertical partition 51 of the moisture-proof partition set 50 has its four edges inlaid into and retained by the first slot 23 and the second slot 24 formed in the lamp housing 20. Accordingly, the interior of the lamp housing 20 is divided into a lamp compartment 25*a* and a driving-device compartment 25*b*.

The driving-device compartment 25*b* of the lamp housing 20 is sealed by the vertical partition 51 and the horizontal partition 52 of the moisture-proof partition set 50 and then obtains an excellent moisture-proof effect. In particular, the lamp assembly 40 is pivotally installed in the lamp compartment 25*a* of the lamp housing 20. So that, both the vertical driving device 60 and the horizontal driving device 70 are securely installed in the driving-device compartment 25*b* of the lamp housing 20.

As shown in FIGS. 2-3 and FIGS. 6-7, the vertical partition 51 of the moisture-proof partition set 50 is provided with a snap-action switch 55 which is installed on the surface exposed to the lamp compartment 25*a* of the lamp housing 20 and is electrically connected to a first detection circuit (not shown in drawings).

The snap-action switch 55 of the lamp housing 20 has an operating function to allow the first detection circuit immediately to send a corresponding signal to the MCU 80 in response to the snap-action switch 55 if once being touched.

As shown in FIG. 4 and FIG. 7, the horizontal partition 52 of the moisture-proof partition set 50 is provided with a photo-electric switch 58 which is installed on the bottom of the horizontal partition 52 of the moisture-proof partition set 50.

The photo-electric switch 58 is composed of a transmitter 58*a*, a receiver 58*b* and a second detection circuit (not shown in drawings), wherein the transmitter 58*a* may emit light that is used to detect whether or not the receiver 58*b* has received the light emitted from the transmitter 58*a*.

The photo-electric switch 58 of the lamp housing 20 has an operating function to allow the second detection circuit immediately to send a corresponding interrupting signal to the MCU 80 in response to the light path of the photoelectric switch 58 if being blocked, because the receiver 58*b* has not received the light emitted from the transmitter 58*a*.

Referring to FIG. 2 through FIG. 7, the vertical driving device 60 comprises a reversible motor 61 and a pinion 62. The vertical driving device 60 is fixed to the vertical partition 51 of the moisture-proof partition set 50, and is received in the driving-device compartment 25*b* of the lamp housing 20.

The horizontal driving device 70 comprises a reversible motor 71 and a pinion 72. The horizontal driving device 70 is fixed to the horizontal partition 52 of the moisture-proof partition set 50, and is received in the driving-device compartment 25*b* of the lamp housing 20.

Figure 6:
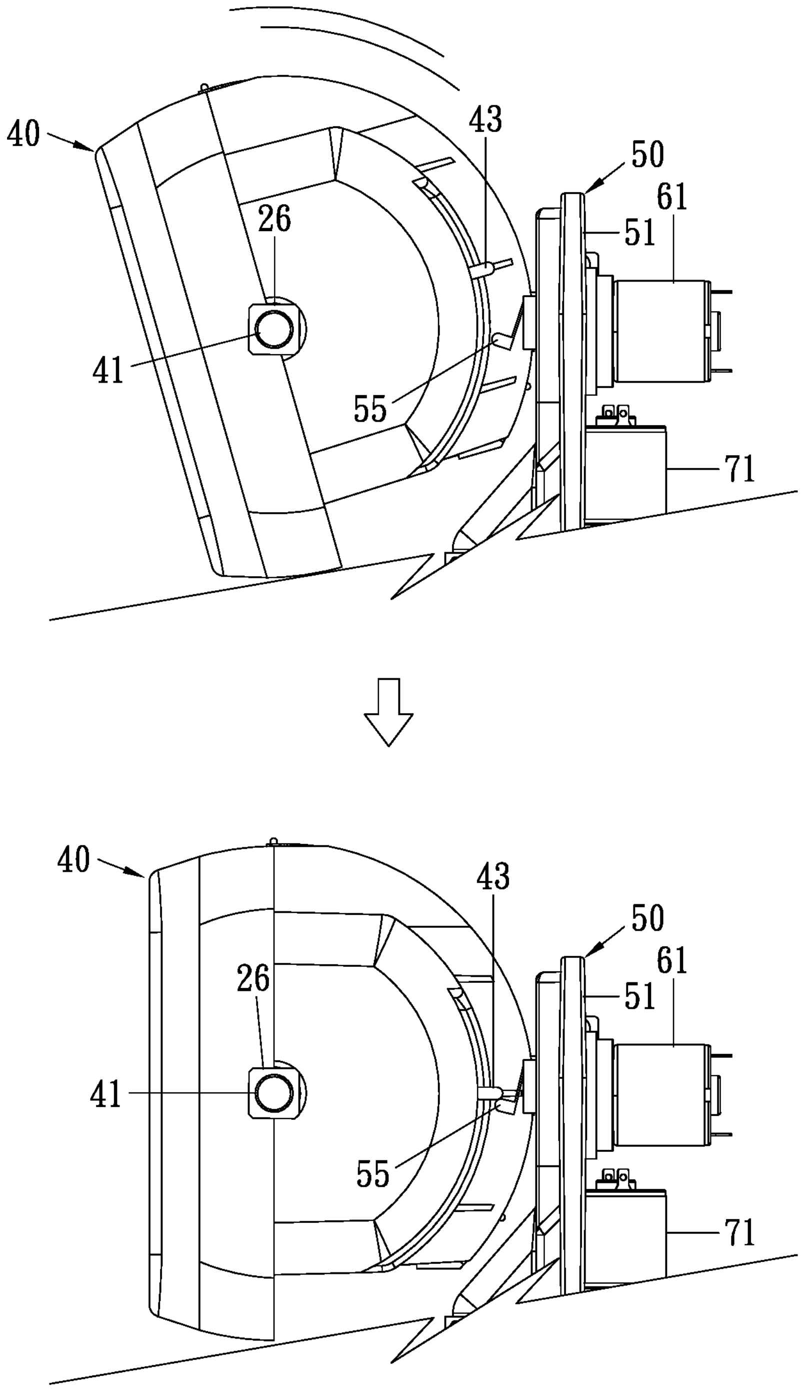
FIG. 6 is an explained drawing to show the lamp assembly of the searchlight of FIG. 2 is capable of being automatically remained at an initial position when the power supply is switched off.

As shown in FIG. 2, FIG. 3 and FIG. 6, the lamp assembly 40 has each of its two laterals provided with a pivot 41, and has its back further provided with a recessed rack 42 and a positioning lever 43.

For pivotally installing the lamp assembly 40 into the lamp compartment 25*a* of the lamp housing 20, the lamp compartment 25*a* of the lamp housing 20 has each of its two laterals provided with a bearing 26 to allow the pivots 41 of the lamp assembly 40 to be pivotally mounted therein.

When assembled, the lamp assembly 40 is pivotally mounted in the lamp compartment 25*a* of the lamp housing 20 of the searchlight 10. Particularly, the lamp assembly 40 is intentionally assembled to locate at an upright position inside the lamp compartment 25*a* of the lamp housing 20, for convenience of illustration and explanation, hereinafter is referred to this assembling position as a "longitudinal starting position" in response to the power supply being switched off.

As shown in FIG. 2, FIG. 6 and FIG. 7, the "longitudinal starting position" for the lamp assembly 40 of the searchlight 10 is further defined as follows:

1. the vertical driving device 60 is fixed to the vertical partition 51 of the moisture-proof partition set 50, and has its pinion 62 engaged with the recessed rack 42 of the lamp assembly 40; and
2. the positioning lever 43 of the lamp assembly 40 has touched to the snap-action switch 55 of the vertical partition 51 of the moisture-proof partition set 50.

As shown in FIG. 2, FIG. 5, and FIG. 7, the support 30 of the searchlight 10 is provided with a stationary gear 35 and a positioning blocker 38, and each of them is securely installed on the top of the support 30 respectively.

Further referred to FIG. 4, when assembled, the support 30 is pivotally supported the lamp housing 20 from below. Particularly, the lamp housing 20 is intentionally assembled to locate at an appropriate position to the support 30, for convenience of illustration and explanation, hereinafter is referred to this assembling position as a "horizontal starting position" in response to the power supply being switched off.

The "horizontal starting position" for the lamp housing 20 of the searchlight 10 is defined as follows:

1. the horizontal driving device 70 is fixed to the horizontal partition 52 of the moisture-proof partition set 50, and has its pinion 72 engaged with the stationary gear 35 of the support 30; and
2. the positioning blocker 38 of the support 30 has interrupted the light path of the photoelectric switch 58 of the horizontal partition 52 of the moisture-proof partition set 50, so that the receiver 58*b* of the photoelectric switch 58 cannot receive the light emitted from the transmitter 58*a* of the photoelectric switch 58.

As shown in FIG. 2, FIG. 6, and FIG. 7, when the power supply which is supplied for the vertical driving device 60 is activated, the recessed rack 42 of the lamp assembly 40 is then driven by the driving force coming from the vertical driving device 60 through the pinion 62, resulted in that the lamp assembly 40 from its initial position at the above-mentioned "longitudinal starting position" begins to move via either a forward rotational movement or a backward rotational movement, i.e., the lamp assembly 40 tilts up and down in the lamp compartment 25*a* of the lamp housing 20 to change its illuminating angle vertically.

Likewise, as shown in FIG. 2, FIG. 5, and FIG. 7, when the power supply which is supplied for the horizontal driving device 70 is activated, the stationary gear 35 of the support 30 keeps no movement but the horizontal driving device 70 is driven by itself driving force coming from its pinion 72, resulted in that the lamp housing 20, together with the lamp assembly 40 installed in its lamp compartment 25*a*, from its initial position at the above-mentioned "horizontal starting position" begins to move via either a rightward rotational movement or a leftward rotational movement, i.e., both the lamp housing 20 and the lamp assembly 40 synchronously swivels right and left against the support 30 to horizontally change the illuminating angle of the lamp assembly 40.

In the course of having the illuminating angle of the lamp assembly 40 vertically and horizontally changeable, when any corresponding power supply required for the searchlight 10 of the present invention begins to be activated, the MCU 80 of the searchlight 10 of the present invention executes to control the required power supply still continuously supplied for the vertical driving device 60 and/or the horizontal driving device 70, even if the snap-action switch 55 of the moisture-proof partition set 50 of the lamp housing 20 is touched with the positioning lever 43 of the lamp assembly 40 and/or even if the light path of the photoelectric switch 58 of the moisture-proof partition set 50 of the lamp housing 20 is interrupted with the positioning blocker 38 of the support 30.

Figure 8:
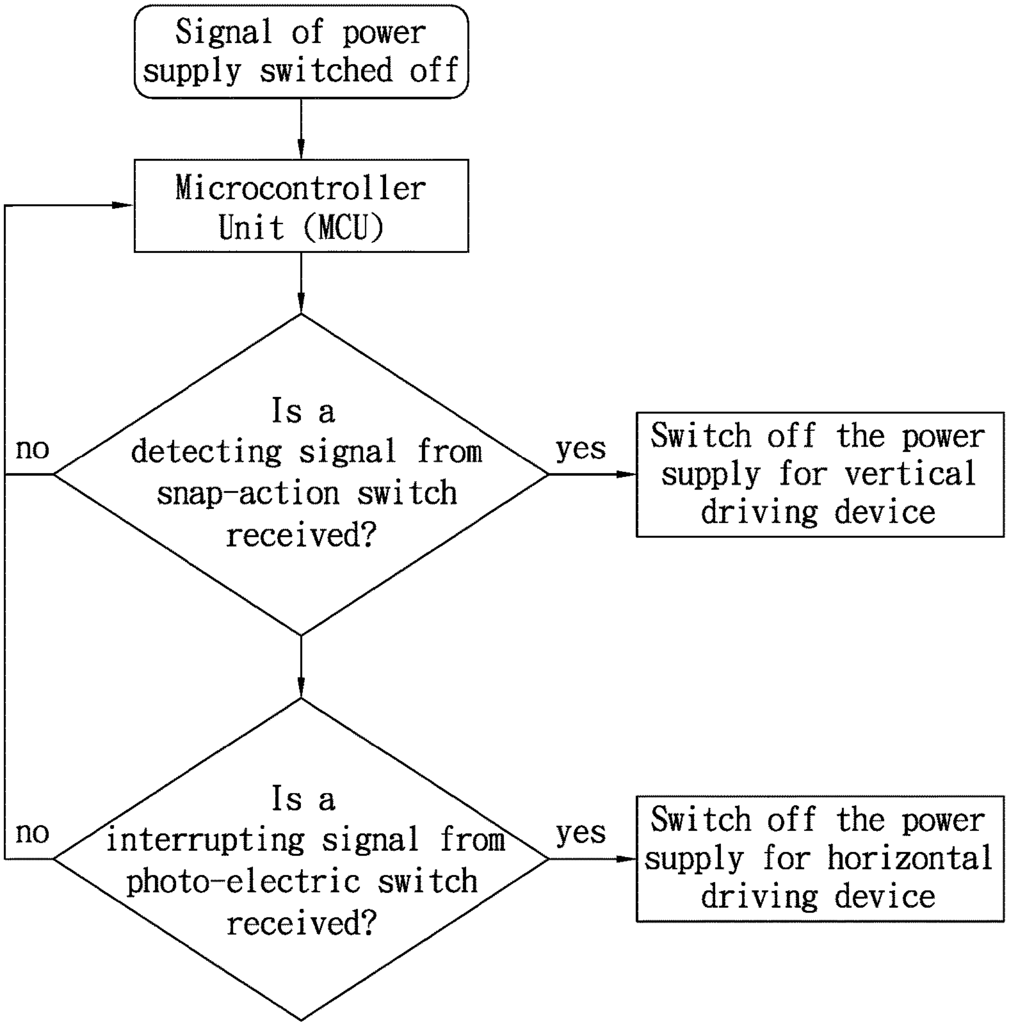
FIG. 8 is a flow chart to explain the searchlight of FIG. 2 has a function of automatically returning to starting position when the power supply is switched off.

However, as shown in FIG. 8, in the course of having the illuminating angle of the lamp assembly 40 vertically and horizontally changeable, when the MCU 80 of the searchlight 10 of the present invention immediately receives a signal of power supply being switched off, the MCU 80 further executes to determine whether the following two operating procedures have been completed, and, if still not completed, the MCU 80 executes to control the required power supply continuously supplied for the vertical driving device 60 and/or the horizontal driving device 70 until the following two operating procedures are determined to be completed:

1. Is a detecting signal sent from the snap-action switch 55 received?
   If received, as shown in FIG. 6, it is meant that the positioning lever 43 of the lamp assembly 40 has touched to the snap-action switch 55 of the moisture-proof partition set 50 of the lamp housing 20, and then the MCU 80 immediately executes to switch off the required power supply supplied for the vertical driving device 60. As a result, the lamp assembly 40 is remained at the initial position, i.e., remained at "longitudinal starting position" defined by the Specification.
2. Is an interrupting signal sent from the photoelectric switch 58 received?
   If received, as shown in FIG. 7, it is meant that the positioning blocker 38 of the support 30 has interrupted the light path of the photoelectric switch 58 of the moisture-proof partition set 50 of the lamp housing 20, and then the MCU 80 immediately executes to switch off the required power supply supplied for the horizontal driving device 70. As a result, the lamp housing 20 together with the lamp assembly 40 are remained at the initial position, i.e., remained at "horizontal starting position" defined by the Specification.

To sum up, the disclosed searchlight 10 of the present invention has a function of automatically returning to the starting position when the power supply is switched off.

What is claimed is:

1. A searchlight having function of automatically returning to starting position when power supply being switched off, comprising a lamp housing, having a moisture-proof partition set provided with a horizontal partition formed as a bottom of the lamp housing and a vertical partition to divide the interior of the lamp housing into a lamp compartment and a driving-device compartment;

a support, pivotally supporting the lamp housing from below, and having a stationary gear installed on a top of the support;

a lamp assembly, pivotally installed inside the lamp compartment of the lamp housing, and having a back provided with a recessed rack and a positioning lever;

a vertical driving device, being received in the driving-device compartment and fixed to the vertical partition of the moisture-proof partition set of the lamp housing, and comprising a reversible motor and a pinion engaged with the recessed rack of the lamp assembly and driven by the reversible motor;

a horizontal driving device, being received in the driving-device compartment and fixed to the horizontal partition of the moisture-proof partition set of the lamp housing, and comprising a reversible motor and a pinion engaged with the stationary gear of the support and driven by the reversible motor;

a microcontroller unit (MCU), installed inside either the lamp housing or the support, and having function to control power supply for the searchlight to be switched on or switched off according to corresponding input control information;

wherein the improvement comprises:

a snap-action switch, installed on the vertical partition of the moisture-proof partition of the lamp housing to immediately send a corresponding signal to the MCU once being touched with the positioning lever of the lamp assembly.

2. The searchlight of claim 1, further comprising a positioning blocker, installed on the top of the support, and a photo-electric switch, having a transmitter to emit light and a receiver to receive the light emitted from the transmitter, and installed on the bottom of the horizontal partition of the moisture-proof partition set of the lamp housing to immediately send a corresponding signal to the MCU if the light emitted from the transmitter is blocked with the positioning blocker of the support and the receiver does not receive the light thereof.

3. A searchlight having function of automatically returning to starting position when power supply being switched off, comprising a lamp housing, having a moisture-proof partition set provided with a horizontal partition formed as a bottom of the lamp housing and a vertical partition to divide the interior of the lamp housing into a lamp compartment and a driving-device compartment;

a support, pivotally supporting the lamp housing from below, and having a stationary gear installed on a top of the support;

a lamp assembly, pivotally installed inside the lamp compartment of the lamp housing, and having a back provided with a recessed rack and a positioning lever;

a vertical driving device, being received in the driving-device compartment and fixed to the vertical partition of the moisture-proof partition set of the lamp housing, and comprising a reversible motor and a pinion engaged with the recessed rack of the lamp assembly and driven by the reversible motor;

a horizontal driving device, being received in the driving-device compartment and fixed to the horizontal partition of the moisture-proof partition set of the lamp housing, and comprising a reversible motor and a pinion engaged with the stationary gear of the support and driven by the reversible motor;

a microcontroller unit (MCU), installed inside either the lamp housing or the support, and having function to control power supply for the searchlight to be switched on or switched off according to corresponding input control information;

wherein the improvement further comprises:

a positioning blocker, installed on the top of the support, and a photo-electric switch, having a transmitter to emit light and a receiver to receive the light emitted from the transmitter, and installed on the bottom of the horizontal partition of the moisture-proof partition set of the lamp housing to immediately send a corresponding signal to the MCU if the light emitted from the transmitter is blocked with the positioning blocker of the support and the receiver does not receive the light thereof.

* * * * *